(12) United States Patent
Hou

(10) Patent No.: US 8,793,817 B2
(45) Date of Patent: Aug. 5, 2014

(54) SAFETY GLASSES

(71) Applicant: Wei Ting Hou, Tainan (TW)

(72) Inventor: Wei Ting Hou, Tainan (TW)

( * ) Notice: Subject to any disclaimer, the term of this patent is extended or adjusted under 35 U.S.C. 154(b) by 81 days.

(21) Appl. No.: 13/668,231

(22) Filed: Nov. 3, 2012

(65) Prior Publication Data
US 2014/0125941 A1    May 8, 2014

(51) Int. Cl.
*A61F 9/02*    (2006.01)

(52) U.S. Cl.
USPC ............................................................ 2/449

(58) Field of Classification Search
USPC ............. 2/449, 426, 427, 429, 431, 438, 448, 2/451, 453, 454; 351/41, 47, 57, 111, 351/121, 158
See application file for complete search history.

(56) References Cited

U.S. PATENT DOCUMENTS

| | | | | |
|---|---|---|---|---|
| 2,300,365 A | * | 10/1942 | Wagner | 2/446 |
| 2,715,224 A | * | 8/1955 | Morrow | 2/451 |
| 5,548,351 A | * | 8/1996 | Hirschman et al. | 351/47 |
| 6,007,196 A | * | 12/1999 | Saba et al. | 351/44 |
| 6,715,873 B2 | * | 4/2004 | Nahmias | 351/44 |
| 7,013,495 B2 | * | 3/2006 | Simmons, Sr. | 2/440 |
| 7,163,288 B1 | * | 1/2007 | Jung | 351/44 |

* cited by examiner

*Primary Examiner* — Tejash Patel (57) ABSTRACT

A pair of safety glasses includes a body having a frame, two temples, and two shields. The frame includes two sides. A pivotal portion is formed on a rear end of each side. Each temple includes a front end having a pivotal section pivotably connected to one of the pivotal portions. Each shield includes a coupling portion on an upper end thereof. The coupling portion of each shield includes a coupling groove having at least one hook. Each shield further includes a lower shielding portion on a lower end thereof. When each temple is in the folded position, the coupling groove of each shield can be coupled to the front end of one of the temples via a spacing between the frame and the temple, with the at least one hook of each shield engaged in at least one retaining groove of one of the temples.

4 Claims, 7 Drawing Sheets

SAFETY GLASSES

BACKGROUND OF THE INVENTION

The present invention relates to a pair of safety glasses and, more particularly, to a pair of safety glasses formed by attaching two shields to a pair of optical eyeglasses, providing assembling convenience and stability.

A pair of optical eyeglasses generally includes a frame and two temples. Two lenses with optical power are mounted in the frame to rectify the eyesight of a wearer. However, the optical glasses do not include any shield for protecting the temples of the wearer. Thus, the eyes of the wearer could be damaged by alien objects from between the lenses and the temples of the wearer. The wearer can wear a pair of safety glasses including a shield on each side thereof to avoid the alien objects. However, the lenses of the safety glasses without optical power are not suitable for nearsighted or farsighted wearers. If the wearer wears the optical eyeglasses and the safety glasses at the same time, the wearer will feel heavy and uncomfortable while causing inconvenience to carriage.

BRIEF SUMMARY OF THE INVENTION

An objective of the present invention is to provide a pair of safety glasses by attaching two shields to a pair of optical eyeglasses, providing enhanced assembling convenience and enhanced stability.

A pair of safety glasses according to the present invention includes a body having a frame and two temples. The frame includes two sides spaced in a width direction, with each side including a rear end having a width in the width direction. A pivotal portion is formed on the rear end of each side, with a width of each pivotal portion in the width direction smaller than the width of the rear end, with a stop wall formed at an interconnection between the rear end and the pivotal portion. Each temple includes a front end having a pivotal section pivotably connected to one of the pivotal portions, allowing the temple to pivot relative to the frame between a folded position and an extended position. The pivotal section of each temple in the folded position has a spacing to one of the stop walls of the frame. The pivotal section of each temple includes at least one retaining groove.

The pair of safety glasses further includes two shields, with each shield including a coupling portion on an upper end thereof. The coupling portion of each shield includes a coupling groove having at least one buckle member with at least one hook. The at least one buckle member further has a front stop. The front end of each temple is engagable with the coupling groove of one of the shields. The at least one hook of each shield is engagable with the at least one retaining groove of one of the temples. Each shield further includes a lower shielding portion on a lower end thereof.

When each temple is in the folded position, the coupling groove of each shield is coupled to the front end of one of the temples via the spacing between the frame and the temple, with the at least one hook of each shield engaged in the at least one retaining groove of one of the temples.

When each temple is in the extended position, the lower shielding portion of each shield covers an area below one of the sides of the frame. The front stop of the at least one buckle member of each shield is aligned with the stop wall of one of the sides of the frame, preventing the shield from disengaging from the frame.

In the form shown, the pivotal section of each temple includes a receiving groove receiving one of the pivotal portions of the frame. The receiving groove of the pivotal section of each temple includes upper and lower walls. The at least one retaining groove includes upper and lower retaining grooves formed in the upper and lower walls, with each of the upper and lower retaining grooves having a rear end wall. The coupling groove of each two shield includes upper and lower wall sections and a lateral wall section between the upper and lower wall sections. The at least one buckle member includes upper and lower buckle members formed on the upper and lower wall sections. The at least one hook includes two hooks respectively formed on the upper and lower buckle members. The hooks are engaged in the upper and lower retaining grooves. Each shield further includes an upper shielding portion extending from the coupling portion in a direction transverse to the lower shielding portion. The upper shielding portion of each shield covers an area above the frame when the temples are in the extended portion. Each pivotal portion of the frame includes a pivot hole extending in a vertical direction perpendicular to the width direction. The pivotal section of each temple includes a pivot hole in the upper and lower walls. A pivot extends through the pivot hole of each pivotal portion of the frame and the pivot hole of the pivotal section of one of the temples.

The present invention will become clearer in light of the following detailed description of illustrative embodiments of this invention described in connection with the drawings.

DETAILED DESCRIPTION OF THE INVENTION

With reference to FIGS. 1-4, a pair of safety glasses according to the present invention includes a body 1 and two shields 2. The body 1 includes a frame 11 and two temples 12. Frame 11 receives two lenses with optical power for use by a user. The frame 11 includes two sides spaced in a width direction, with each side including a rear end 111 having a width in the width direction. A pivotal portion 112 is formed on the rear end 111 of each side, with a width of each pivotal portion 112 in the width direction smaller than the width of the rear end 111. A stop wall 113 is formed at an interconnection between the rear end 111 of each side and one of the pivotal portions 112. Each pivotal portion 112 of the frame 11 includes a pivot hole 114 extending in a vertical direction perpendicular to the width direction.

Figure 1:
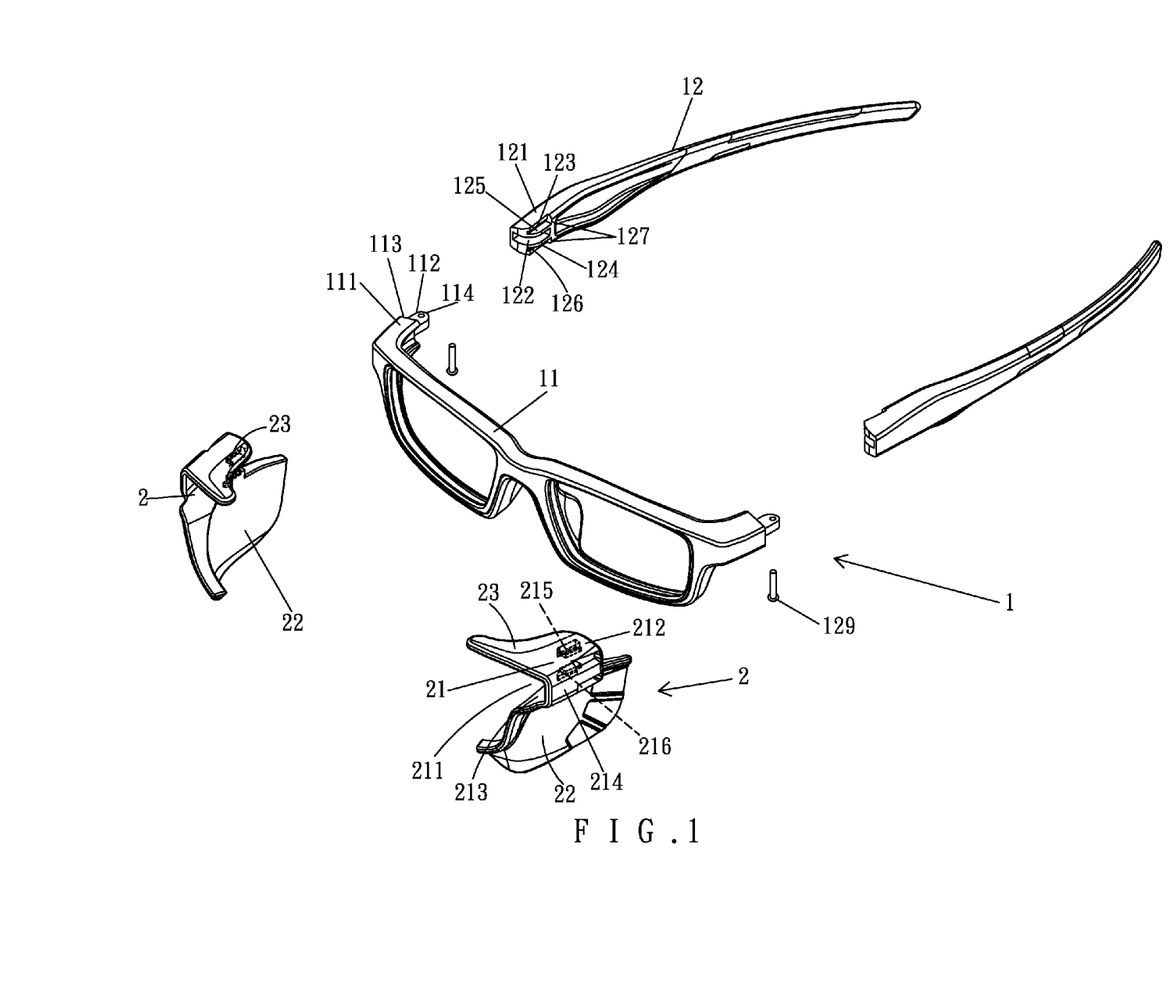
FIG. 1 shows an exploded, perspective view of a pair of safety glasses according to the present invention.
Figure 2:
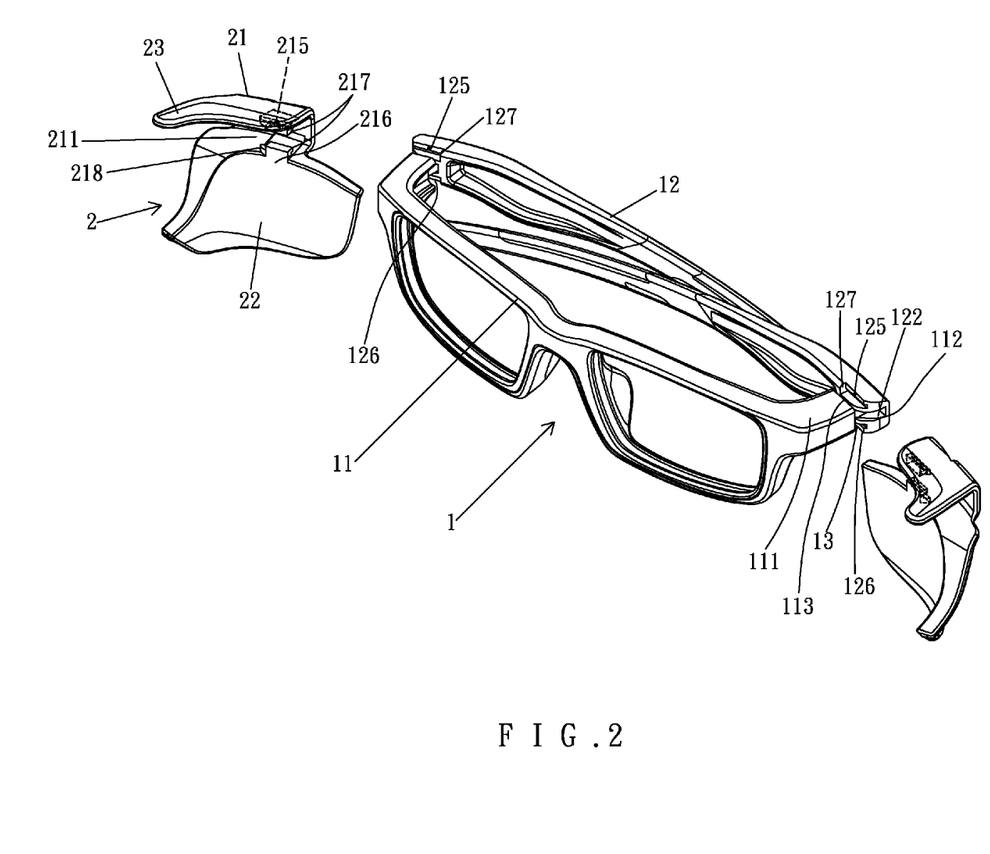
FIG. 2 shows a perspective view of the pair of safety glasses of FIG. 1, with two shields not attached.
Figure 4:
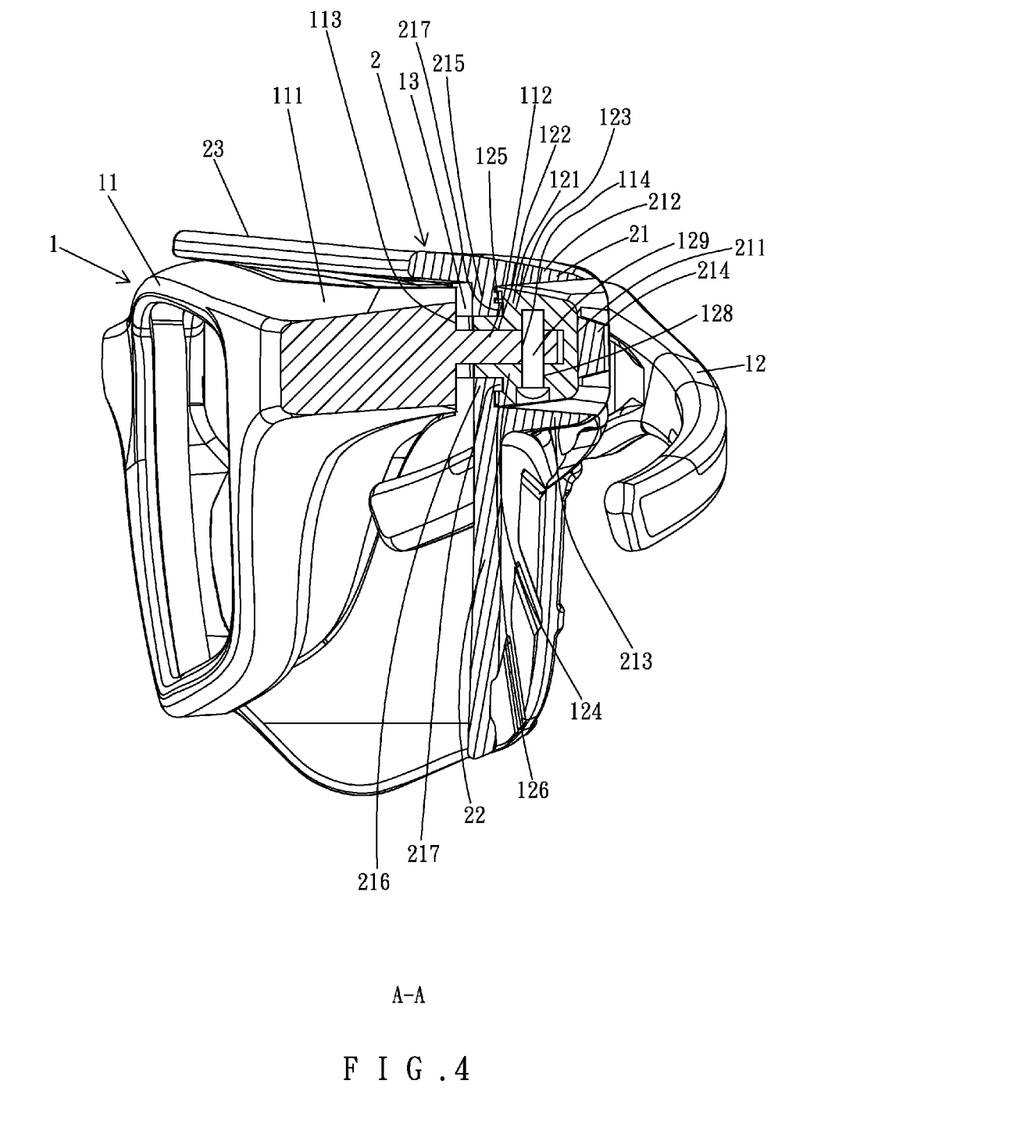
FIG. 4 shows a cross sectional view taken along section line A-A of FIG. 3.

Each temple 12 includes a front end having a pivotal section 121 pivotably connected to one of the pivotal portions 112. The pivotal section 121 of each temple 12 includes a receiving groove 122 for receiving one of pivotal portions 112 of frame 1. The receiving groove 122 of the pivotal section 121 of each temple 12 includes upper and lower walls 123 and 124. Upper and lower retaining grooves 125 and 126 are formed in the upper and lower walls 123 and 124, with each of the upper and lower retaining grooves 125 and 126 having a rear end wall 127. The pivotal section 121 of each temple 2 includes a pivot hole 128 in the upper and lower walls 123 and 124. A pivot 129 extends through the pivot hole 114 of each pivotal portion 112 of the frame 11 and the pivot hole 128 of the pivotal section 121 of one of the two temples 2. Thus, the temples 12 can pivot relative to the frame 11 between a folded position and an extended position. The pivotal section 121 of each temple 12 in the folded position has a spacing 13 to one of the stop walls 113 of the frame 11 (FIGS. 2 and 4).

Each shield 2 includes a coupling portion 21 on an upper end thereof and a lower shielding portion 22 on a lower end thereof. The coupling portion 21 of each shield 2 includes a coupling groove 211 having upper and lower wall sections 212 and 213 spaced from each other in the vertical direction and a lateral wall section 214 between the upper and lower wall sections 212 and 213. Upper and lower buckle members 215 and 216 are formed on the upper and lower wall sections 212 and 213. Two hooks 217 are respectively formed on the upper and lower buckle members 215 and 216 for engagement with the upper and lower retaining grooves 125 and 126. Each of the upper and lower buckle members 215 and 216 includes a front stop 218 at a front end thereof. Each shield 2 further includes an upper shielding portion 23 extending from the coupling portion 21 in a direction transverse to the lower shielding portion 22.

The frame 11 and the temples 12 are assembled with each other, and two lenses with optical power are received in the frame 11 for rectifying the eyesight of the user. In regular use, the shields 2 are not attached to the body 1 to reduce the overall weight.

Figure 3:
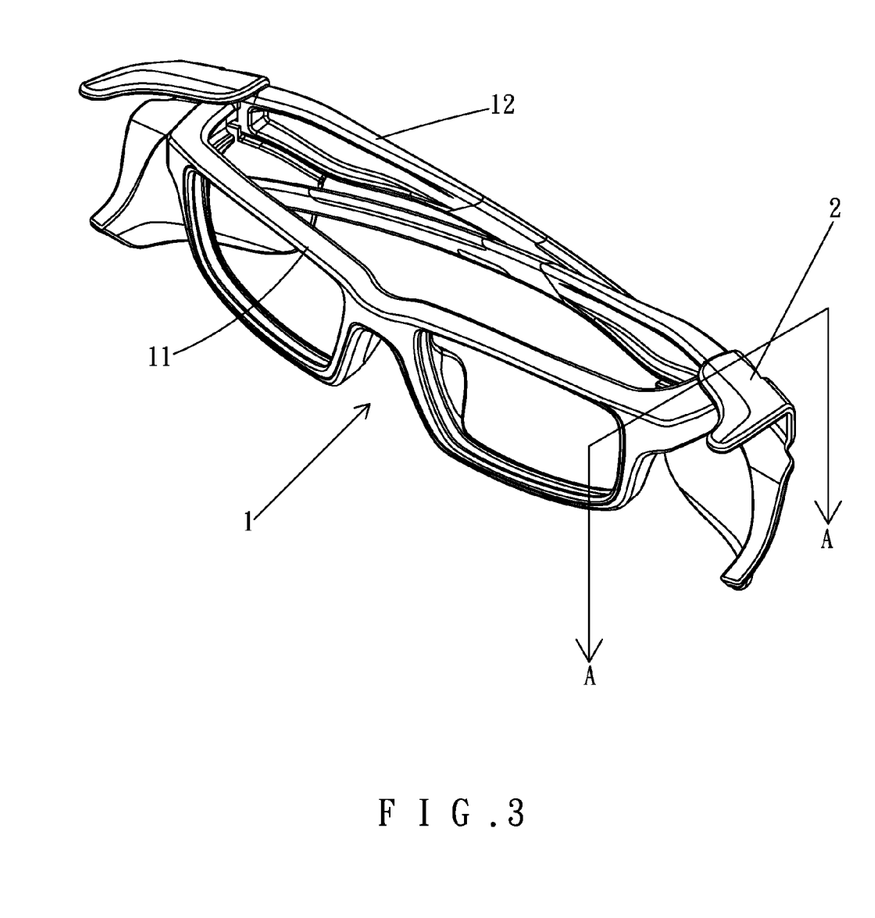
FIG. 3 shows a perspective view of the pair of safety glasses of FIG. 1 after assembly.

When it is desired to form a pair of safety glasses, the temples 12 are pivoted to the folded position, the coupling groove 211 of each of the two shields 2 is coupled to the front end of one of the temples 12 via the spacing 13 between the frame 11 and the temple 12, with the hooks 217 of each shield 2 engaged in the upper and lower retaining grooves 125 and 126 of the temple 12, providing enhanced assembling stability. The hooks 217 abut the end walls 127 to retain the temples 12 in position.

Figure 5:
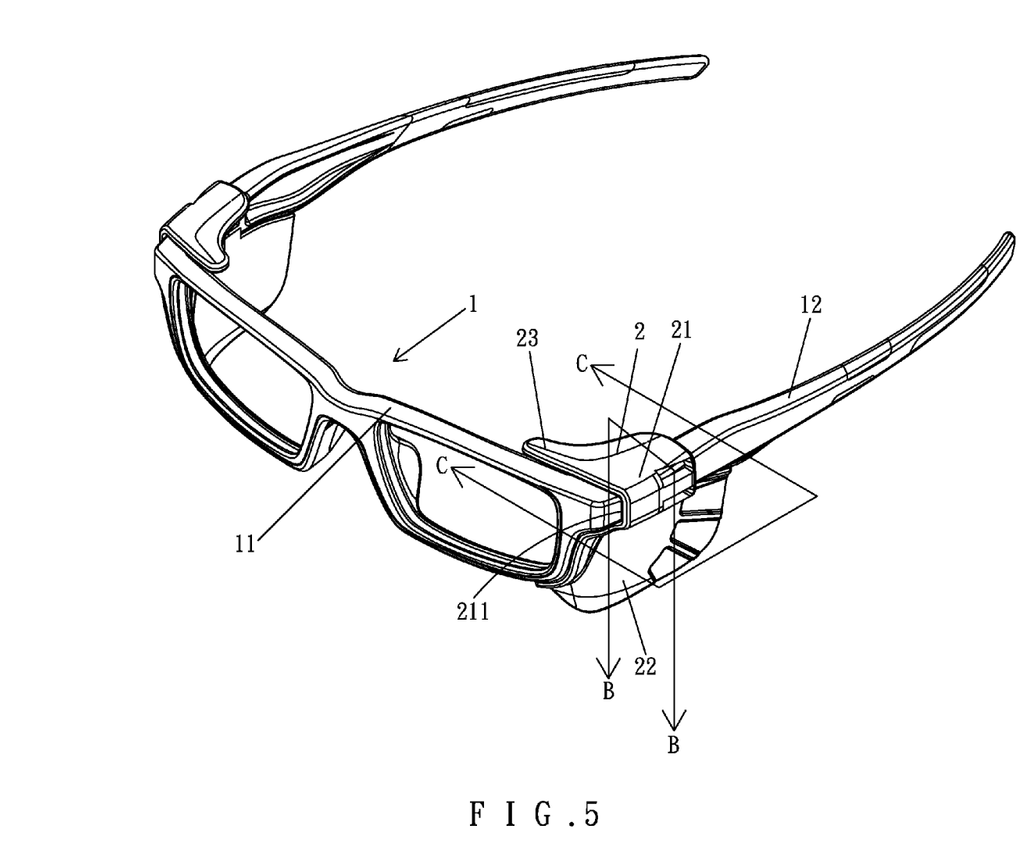
FIG. 5 shows a perspective view of the pair of safety glasses of FIG. 3, with two temples in an extended position.
Figure 6:
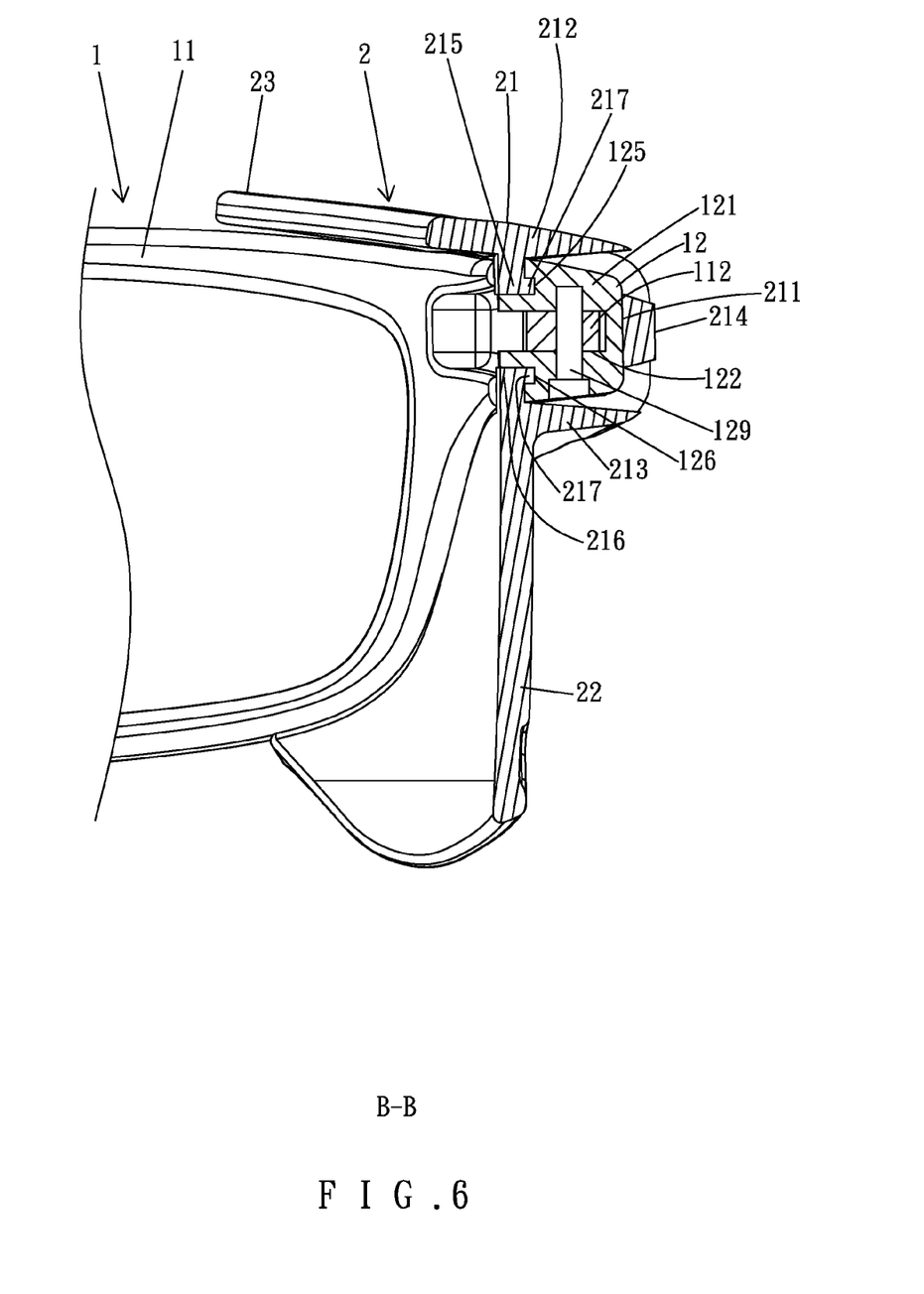
FIG. 6 shows a cross sectional view taken along section line B-B of FIG. 5.
Figure 7:
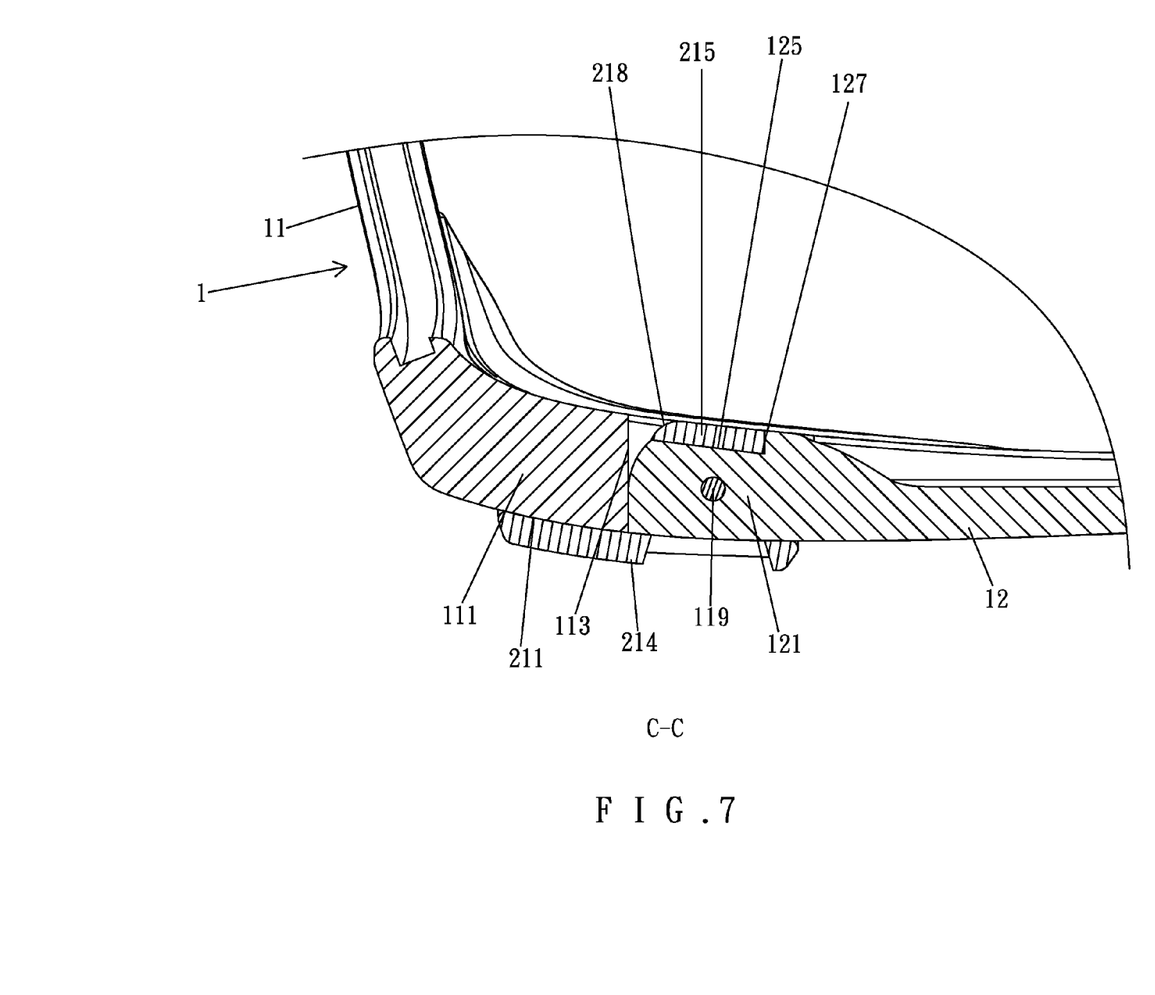
FIG. 7 shows a cross sectional view taken along section line C-C of FIG. 5.

With reference to FIGS. 5-7, when the temples 12 are pivoted to the extended position, the lower shielding portion 22 of each shield 2 covers an area below one of the sides of the frame 1. The upper shielding portion 23 of each shield 2 covers an area above the frame 11. The front stop 218 of each shield 2 is aligned with the stop wall 113 of one of the sides of the frame 11, preventing the shield 2 from disengaging from the body 1. After assembly, receiving hole 211 of each shield 2 receives the rear end 111 of one of the sides of the frame 1 and the pivotal section 121 of one of the temples 12, providing enhanced assembling reliability. Furthermore, the shields 2 shield the pivotal connection areas between the frame 11 and the temples 12 to avoid the eyes of the user from being injured by alien objects while providing enhanced visual quality.

When it is desired to detach the shields 2, the temples 12 are pivoted to the folded position, and the shields 2 can be easily attached by moving away from the body 1.

Although specific embodiments have been illustrated and described, numerous modifications and variations are still possible without departing from the essence of the invention. The scope of the invention is limited by the accompanying claims.

The invention claimed is:

1. A pair of safety glasses comprising:
  a body including a frame and two temples, with the frame including two sides spaced in a width direction, with each of the two sides including a rear end having a width in the width direction, with a pivotal portion formed on the rear end of each of the two sides, with a stop wall formed at an interconnection between the rear end and the pivotal portion, with each of the two temples including a front end having a pivotal section pivotably connected to one of the pivotal portions, allowing the temple to pivot relative to the frame between a folded position and an extended position, with the pivotal section of each of the two temples in the folded position having a spacing to one of the stop walls of the frame, with the pivotal section of each of the two temples including at least one retaining groove; and
  two shields, with each of the two shields including a coupling portion on an upper end thereof, with the coupling portion of each of the two shields including a coupling groove having at least one buckle member with at least one hook, with the at least one buckle member further having a front stop, with the front end of each of the two temples engagable with the coupling groove of one of the two shields, with the at least one hook of each of the two shields engagable with the at least one retaining groove of one of the two temples, with each of the two shields further including a lower shielding portion on a lower end thereof,
  wherein with each of the two temples in the folded position, the coupling groove of each of the two shields is engagable with the front end of one of the temples via the spacing between the frame and the temple, with the at least one hook of each of the two shields engaged in the at least one retaining groove of one of the two temples,
  wherein with each of the two temples in the extended position, the lower shielding portion of each of the two shields covers an area below one of the two sides of the frame, with the front stop of the at least one buckle member of each of the two shields aligned with the stop wall of one of the two sides of the frame, preventing the shield from disengaging from the frame.

2. The pair of safety glasses as claimed in claim 1, with the pivotal section of each of the two temples including a receiving groove receiving one of the pivotal portions of the frame, with the receiving groove of the pivotal section of each of the two temples including upper and lower walls, with the at least one retaining groove including upper and lower retaining grooves formed in the upper and lower walls, with each of the upper and lower retaining grooves having a rear end wall, with the coupling groove of each of the two shields including upper and lower wall sections and a lateral wall section between the upper and lower wall sections, with the at least one buckle member including upper and lower buckle members formed on the upper and lower wall sections, with the at least one hook including two hooks respectively formed on the upper and lower buckle members, with the two hooks engaged in the upper and lower retaining grooves.

3. The pair of safety glasses as claimed in claim 1, with each of the two shields further including an upper shielding portion extending from the coupling portion in a direction transverse to the lower shielding portion, with the upper shielding portion of each of the two shields covering an area above the frame when the temples are in the extended portion.

4. The pair of safety glasses as claimed in claim 2, with each of the pivotal portions of the frame including a pivot hole extending in a vertical direction perpendicular to the width direction, with the pivotal section of each of the two temples including a pivot hole in the upper and lower walls, with a pivot extending through the pivot hole of each of the pivotal portions of the frame and the pivot hole of the pivotal section of one of the two temples.

* * * * *